United States Patent
Kim et al.

(10) Patent No.: US 11,290,198 B2
(45) Date of Patent: Mar. 29, 2022

(54) METHOD AND APPARATUS FOR DETECTING OBSTACLE

(71) Applicant: Samsung Electronics Co., Ltd., Suwon-si (KR)

(72) Inventors: Jong-Sok Kim, Hwaseong-si (KR); Byung Kwan Kim, Suwon-si (KR); Sungdo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 15/930,834

(22) Filed: May 13, 2020

(65) Prior Publication Data

US 2021/0143919 A1    May 13, 2021

(30) Foreign Application Priority Data

Nov. 12, 2019  (KR) .......................... 10-2019-0144471

(51) Int. Cl.

| H04B 7/04 | (2017.01) |
| H01Q 3/24 | (2006.01) |
| H04B 17/21 | (2015.01) |
| H04B 17/318 | (2015.01) |
| H04B 7/08 | (2006.01) |
| H01Q 21/28 | (2006.01) |
| H04W 52/24 | (2009.01) |

(Continued)

(52) U.S. Cl.
CPC ............. *H04B 17/21* (2015.01); *H01Q 1/243* (2013.01); *H01Q 3/247* (2013.01); *H01Q 21/28* (2013.01); *H04B 7/0808* (2013.01); *H04B 7/0814* (2013.01); *H04B 7/0888* (2013.01); *H04B 17/318* (2015.01); *H04W 16/28* (2013.01); *H04W 52/241* (2013.01); *H04W 68/005* (2013.01)

(58) Field of Classification Search
CPC ........ H04B 7/08; H04B 7/0802; H04B 17/21; H04B 17/30; H04B 17/304; H04B 17/318; H04B 7/04; H01Q 1/243; H01Q 3/247; H01Q 21/28; H01Q 3/24
See application file for complete search history.

(56) References Cited

U.S. PATENT DOCUMENTS 8,618,932 B2    12/2013 Maia et al.
9,420,559 B2 *    8/2016 Bai ....................... H04W 4/027
(Continued)

FOREIGN PATENT DOCUMENTS

| KR | 10-0662251 B1 | 1/2007 |
| KR | 10-2015-0082855 A | 7/2015 |

*Primary Examiner* — Blane J Jackson
(74) *Attorney, Agent, or Firm* — NSIP Law

(57) ABSTRACT

Disclosed are obstacle detecting methods and apparatuses, the method of detecting an obstacle near a device includes, determining whether to detect an obstacle, detecting the obstacle using communication modules, in response to determining to detect the obstacle, determining whether a result of detecting the obstacle meets a threshold, detecting the obstacle using antennas of a communication module corresponding to a direction of the obstacle from among the communication modules, in response to the result of determining the obstacle meeting the threshold, and outputting a warning signal based on the result of detecting the obstacle using the communication modules or a result of detecting the obstacle using the antennas.

23 Claims, 6 Drawing Sheets

(51) Int. Cl.
    *H04W 68/00*     (2009.01)
    *H01Q 1/24*     (2006.01)
    *H04W 16/28*     (2009.01)

(56) References Cited

U.S. PATENT DOCUMENTS

| | | |
|---|---|---|
| 9,536,409 B1 | 1/2017 | Barth |
| 9,846,999 B1 * | 12/2017 | Pickover ............ H04M 1/72403 |
| 10,036,809 B2 | 7/2018 | Shin et al. |
| 10,311,304 B2 * | 6/2019 | Bender .................. G06F 3/011 |
| 10,325,508 B2 * | 6/2019 | Mahnke ................... G08G 9/02 |

\* cited by examiner

METHOD AND APPARATUS FOR DETECTING OBSTACLE

This application claims the benefit under 35 USC § 119(a) of Korean Patent Application No. 10-2019-0144471 filed on Nov. 12, 2019, in the Korean Intellectual Property Office, the entire disclosure of which is incorporated herein by reference for all purposes.

BACKGROUND

1. Field

The following description relates to methods and apparatus of detecting an obstacle using a communication module for data communication.

2. Description of Related Art

The fifth generation (5G) mobile communication may support services such as, an ultra-wideband mobile data service, an ultra-reliable and low-latency communication service, and a machine-to-machine (M2M) communication service, based on technology standards with improved performance. The 5G communication may provide a function of processing data of more than 10 gigabits (Gb) per second while minimizing the consumption of power by using a millimeter wave (mmWave) band. A unit antenna of a communication module for 5G wireless communication may be small with a size of 1 centimeter (cm) or less with respect to the mmWave band, and may have output power that is not relatively great. Thus, an antenna array may be used to construct a transmission and reception system. The antenna array may perform a hybrid beamforming function along with a phase shifter and an attenuator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of detecting an obstacle near a device, the method including determining whether to detect an obstacle, detecting the obstacle using communication modules, in response to determining to detect the obstacle, determining whether a result of detecting the obstacle meets a threshold, detecting the obstacle using antennas of a communication module corresponding to a direction of the obstacle from among the communication modules, in response to the result of determining the obstacle meeting the threshold, and outputting a warning signal based on the result of detecting the obstacle using the communication modules or a result of detecting the obstacle using the antennas.

The determining of whether to detect the obstacle may include obtaining environment information of the device using any one or any combination of the communication modules and at least one sensor, and determining whether to detect the obstacle based on the obtained environment information.

The determining of whether to detect the obstacle may include transmitting a first detection signal in all directions using the communication modules, receiving a first reflected signal corresponding to the first detection signal, and determining whether to detect the obstacle based on the received first reflected signal.

The determining of whether to detect the obstacle based on the first reflected signal may include determining whether the obstacle is present based on an intensity of the first reflected signal, determining whether the obstacle is present at a short distance or at a long distance based on the intensity of the first reflected signal, in response to the obstacle being present, and determining whether to detect the obstacle based on the intensity of the first reflected signal, in response to the obstacle being present at the long distance.

The detecting of the obstacle using the communication modules may include detecting the obstacle by selectively using a portion of the communication modules.

The detecting of the obstacle using the communication modules may include transmitting a second detection signal to the obstacle by alternately using the communication modules, and outputting a result of detecting the obstacle from a second reflected signal corresponding to the second detection signal.

The determining of whether the result of detecting the obstacle meets a threshold may include determining whether a signal-to-noise ratio (SNR) of a second reflected signal that is reflected from the obstacle, the direction of the obstacle, and a distance from the device, which are included in the result of detecting the obstacle using the communication modules, each satisfy a condition.

The detecting of the obstacle using the antennas may include transmitting, to the obstacle, a third detection signal beamformed using the antennas, and outputting a result of detecting the obstacle from a third reflected signal corresponding to the third detection signal.

The outputting of the warning signal may include outputting the warning signal visually, auditorily, or tactilely.

In another general aspect, there is provided an obstacle detecting apparatus including communication modules, a processor configured to determine whether to detect an obstacle, detect the obstacle using the communication modules, in response to determining to detect the obstacle, determine whether a result of detecting the obstacle meets a threshold, and detect the obstacle using antennas of a communication module corresponding to a direction of the obstacle from among the communication modules, in response to the result of detecting the obstacle meeting the threshold, and an outputter configured to output a warning signal based on the result of detecting the obstacle using the communication modules or a result of detecting the obstacle using the antennas.

The communication modules may be configured to transmit a first detection signal in all directions, receive a first reflected signal corresponding to the first detection signal, wherein the processor may be configured to determine whether to detect the obstacle based on the received first reflected signal.

The processor may be configured to determine whether the obstacle is present based on an intensity of the first reflected signal, determine whether the obstacle is present at a short distance or at a long distance based on the intensity of the first reflected signal, in response to the obstacle being present, and determine whether to detect the obstacle based on the intensity of the first reflected signal, in response to the obstacle being present at the long distance.

The processor may be configured to obtain environment information of the obstacle detecting apparatus using any one or any combination of the communication modules and at least one sensor, and determine whether to detect the obstacle based on the obtained environment information.

The processor may be configured to detect the obstacle by selectively using a portion of the communication modules.

The communication modules may be configured to alternately transmit a second detection signal to the obstacle, and receive a second reflected signal corresponding to the second detection signal, wherein the processor may be configured to output a result of detecting the obstacle by analyzing the second reflected signal.

The processor may be configured to determine whether a signal-to-noise ratio (SNR) of a second reflected signal that is reflected from the obstacle, the direction of the obstacle, and a distance from the obstacle detecting apparatus, which are included in the result of detecting the obstacle using the communication modules, each satisfy a condition.

The communication module corresponding to the direction of the obstacle may be configured to transmit a beamformed third detection signal to the obstacle, and receive a third reflected signal corresponding to the third detection signal, wherein the processor may be configured to output a result of detecting the obstacle by analyzing the third reflected signal.

The outputter may be configured to output any one or any combination of visual, auditory, and tactile warning signal.

In another general aspect, there is provided an obstacle detecting apparatus including a processor configured to determine whether to detect an obstacle in the vicinity of the apparatus based on environment information of the apparatus, transmit a first detection signal around the apparatus using communication modules to detect the obstacle, determine a direction of the obstacle using the first reflected signal received at the communication modules, detect the obstacle using a second detection signal beamformed using antennas of a communication module corresponding to the direction of the obstacle from among the communication modules, in response to the first reflected signal meeting a threshold, and output a warning signal based on any one or any combination of a second reflected signal corresponding to the second detection signal and the first reflected signal, and an outputter configured to output the warning signal.

The processor may be configured to periodically obtain the environment information of the apparatus, in response to determining not to detect the obstacle based on the environment information of the apparatus.

The processor may be configured to obtain the environment information of the apparatus, in response to detecting a motion of the apparatus.

The threshold may be based on any one or any combination of the direction of the obstacle, a size of the obstacle, a type of the obstacle, a moving speed of the obstacle, a moving speed of the apparatus, and a relative moving direction of the obstacle and the apparatus.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
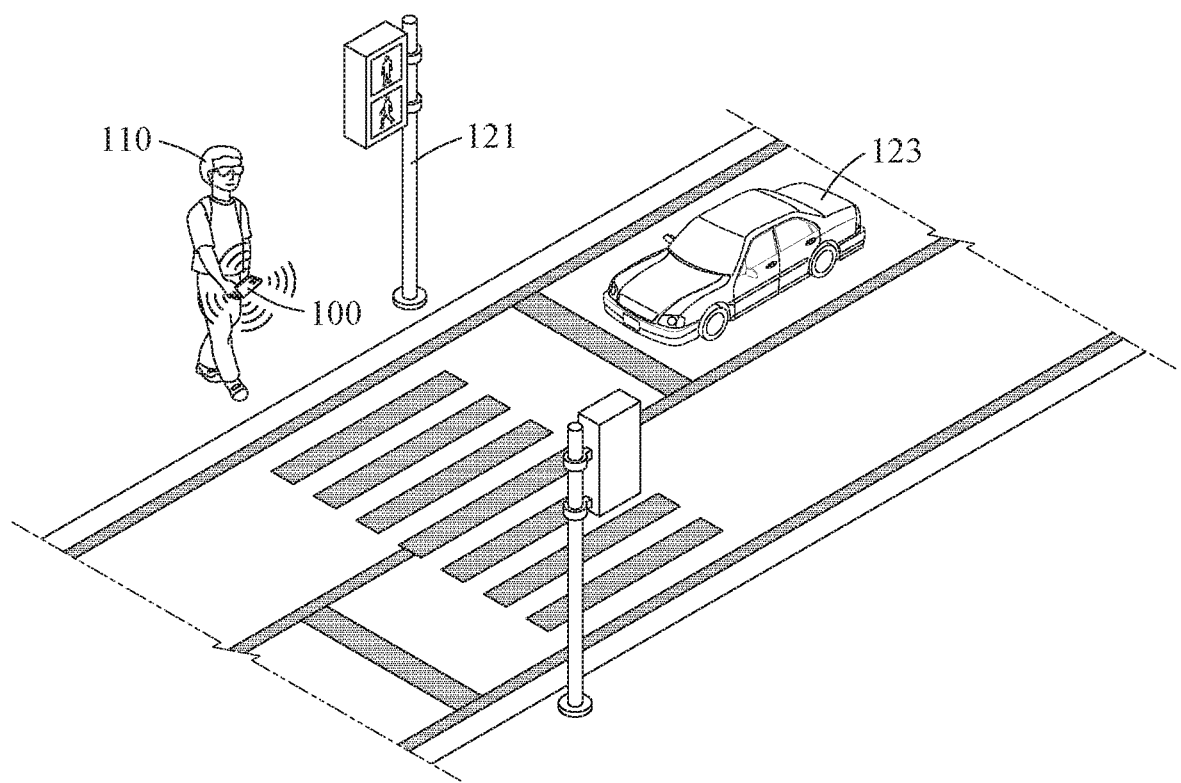
FIG. 1 is a diagram illustrating an example of detecting an obstacle by an obstacle detecting apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s). Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of detecting an obstacle by an obstacle detecting apparatus.

An obstacle detecting apparatus 100 may detect an obstacle effectively using a resource and give a user 110 a warning about the detected obstacle. The obstacle detecting apparatus 100 may effectively use a limited resource by gradually increasing a degree of precision in detecting an obstacle. For example, the obstacle detecting apparatus 100 may effectively use power and a memory by classifying in detail an overall operation into, for example, an operation of determining whether to detect an obstacle, an operation of detecting an obstacle, and an operation of more precisely detecting the obstacle in a particular direction.

For example, when the user 110 walks without paying attention to an obstacle that is present nearby, the obstacle detecting apparatus 100 may automatically detect the obstacle and provide a warning signal to the user 110. For example, when the user 110 is a visually impaired person, the obstacle detecting apparatus 100 may provide an audible warning signal or a tactile warning signal to the user 110.

A vision-based obstacle detecting method may use a small visual sensor, and may thus contribute to reducing a volume and a weight of a device. In addition, it may obtain more accurate information about an obstacle using a high resolution. However, the vision-based obstacle detecting method may use a relatively great amount of power and computing resources for image processing, and be susceptible to visual environment conditions including, for example, weather and intensity of illumination. In contrast, the obstacle detecting apparatus 100 may detect an obstacle with a relatively smaller amount of costs for data processing by using a communication module, compared to the vision-based obstacle detecting method using a camera. In addition, the obstacle detecting apparatus 100 may be robust against variable conditions including, for example, weather or intensity of illumination, which may affect a visual sensor.

A sound-based obstacle detecting method may use an inaudible frequency and a matched field technique, and identify a distance to an object based on a similar principle as radio detection and ranging (RADAR) operates. However, the sound-based obstacle detecting method may not be suitable to detect a direction of an obstacle due to an omnidirectional characteristic of a sound signal. In contrast, the obstacle detecting apparatus 100 may detect a direction of an obstacle using a plurality of communication modules each disposed to correspond to a specific direction, compared to the sound-based obstacle detecting method.

The obstacle detecting apparatus 100 may be a terminal that performs data communication using an access point (AP) and a communication network, and a terminal including a memory configured to store a program or a protocol for communicating with an external device through the AP and the communication network, and a microprocessor configured to execute, operate, and control the program. The obstacle detecting apparatus 100 may be a smartphone, for example.

The obstacle detecting apparatus 100 may detect an obstacle using a communication module that is used for wireless communication. For example, when the obstacle detecting apparatus 100 is a smartphone, a communication module for fifth generation (5G) communication that is installed in the smartphone may be used to detect an obstacle. For example, the communication module of the obstacle detecting apparatus 100 may use various wireless communication methods such as, for example, the 5G communication and WiFi communication of 802.11ad/ay of the institute of electrical and electronics engineers (IEEE), to detect an obstacle. Thus, the obstacle detecting apparatus 100 may utilize an already installed communication module that is used for wireless communication of a smartphone, and the like, thereby reducing cost and volume of the apparatus.

The obstacle detecting apparatus 100 may use a preset field or code of a signal that is transmitted and received according to each of the various wireless communication methods such as, for example, the 5G communication or the WiFi communication. In an example, the obstacle detecting apparatus 100 detects an obstacle by analyzing a packet of a reflected signal. For example, the obstacle detecting apparatus 100 may measure a distance to an obstacle based on a time difference between a transmitted signal and a received signal by using a Golay complementary code of a channel estimation field included in a communication signal. However, what is described in the foregoing is provided merely as an example, and various code sequences may be used to detect an obstacle and a reserved field or code that is not set in advance may be used to detect an obstacle without departing from the spirit and scope of the illustrative examples described.

The obstacle detecting apparatus 100 may detect an obstacle using a preset frequency band according to the WiFi communication. For example, a communication module may use a frequency of 60 gigahertz (GHz). However, what is described in the foregoing is provided merely as an example, and various frequencies may be used without departing from the spirit and scope of the illustrative examples described. The communication module using the frequency of 60 GHz may be small in size, and thus the communication module may be provided as a plurality of communication modules in a narrow space inside a device. The communication modules distributed inside the obstacle detecting apparatus 100 may detect an obstacle through beamforming of a plurality of antennas therein.

The obstacle detecting apparatus 100 may first determine whether to detect an obstacle. That is, the obstacle detecting apparatus 100 may determine the presence of a need to detect an obstacle. For this, the obstacle detecting apparatus 100 may obtain environment information using a plurality of communication modules or other sensors. For example, the obstacle detecting apparatus 100 may include, for example, an acceleration sensor, a gravity sensor, and a gyro sensor, in addition to the communication modules. The obstacle detecting apparatus 100 may transmit a detection signal in all directions and obtain the environment information through a reflected signal.

For example, when the obstacle detecting apparatus 100 is in a closed state and determines that there is no need to detect an obstacle, the obstacle detecting apparatus 100 may repeatedly obtain the environment information on a periodic basis. For example, when the obstacle detecting apparatus 100 is in a pocket or a bag of the user 110, the obstacle detecting apparatus 100 may determine a closed environment, and change an operation mode thereof to a sleep mode in which the obstacle detecting apparatus 100 suspends detecting an obstacle or stay in a standby mode in which the obstacle detecting apparatus 100 obtains the environment information on a periodic basis.

In an example, the obstacle detecting apparatus 100 may determine whether to detect an obstacle by determining whether the user 110 is moving. In an example, the obstacle detecting apparatus 100 may determine whether the user 110 is moving using the communication modules or a global positioning system (GPS). When the obstacle detecting apparatus 100 determines that the user 110 stands still, the obstacle detecting apparatus 100 may determine that there is no need to detect an obstacle. The obstacle detecting apparatus 100 may then change the operation mode to the sleep mode in which detecting an obstacle is suspended, or stay the standby mode in which the environment information is obtained on a periodic basis.

The obstacle detecting apparatus 100 may determine to detect an obstacle. In an example, when the obstacle detecting apparatus 100 determines that the user 110 is moving and the obstacle detecting apparatus 100 is not in a closed environment, the obstacle detecting apparatus 100 may detect an obstacle. In an example, the obstacle detecting apparatus 100 may roughly detect a direction of the obstacle, and then detect the obstacle more precisely.

In another example, the obstacle detecting apparatus 100 may determine whether to detect an obstacle based on a user input. The user 110 may input a signal that activates an obstacle detection mode to the obstacle detecting apparatus 100. The obstacle detecting apparatus 100 may then activate the obstacle detection mode based on the input signal.

In an example, the obstacle detecting apparatus 100 may detect an obstacle in a wide area, and then detect the obstacle in a narrow area. In an example, a process of detecting an obstacle in a wide area may also be referred to herein as a first detection mode, and a process of detecting the obstacle in a narrow area may also be referred to as a second detection mode. The wide area which is a detection area in the first detection mode may indicate an area with a greater detection angle compared to that of the narrow area which is a detection area in the second detection mode. For example, the wide area may include an area in front, an area on a left side, and an area on a right side, and correspond to a detection angle of 270°. The narrow area may include one of the area in front, the area on the left side, and the area on the right side, and correspond to a detection angle of 90° or less. In the first detection mode, the obstacle detecting apparatus 100 may obtain rough information including, for example, a direction of an obstacle, using the communication modules with a detection area being divided into a front side, a left side, and a right side. In the second detection mode, the obstacle detecting apparatus 100 may obtain more precise information of the obstacle through digital beamforming or analog beamforming using a plurality of antennas included in one of the communication modules.

In the first detection mode, the obstacle detecting apparatus 100 may detect a direction of an obstacle by selectively using a communication module corresponding to a specific direction among the communication modules. The obstacle detecting apparatus 100 may detect the direction of the obstacle by turning on and/or off each of the communication modules. The obstacle detecting apparatus 100 may detect the direction of the obstacle by selectively using a group of communication modules corresponding to a specific direction among the communication modules. The obstacle detecting apparatus 100 may determine whether an obstacle is present in a direction corresponding to a communication module based on an intensity of a reflected signal and the like.

In an example, the obstacle detecting apparatus 100 may obtain rough information of an obstacle while detecting a direction of the obstacle. In an example, the obstacle detecting apparatus 100 may determine whether to detect the obstacle more precisely using the direction of the obstacle and the information of the object. The obstacle detecting apparatus 100 may determine whether to detect the obstacle more precisely based on factors such as, for example, the direction of the obstacle, a size of the obstacle, a moving speed of the object, or a relative moving direction of the obstacle and the user 110.

For example, referring to FIG. 1, when an obstacle is determined to be a vehicle 123 which is moving, the obstacle detecting apparatus 100 may provide the user 110 with a warning signal indicated as, for example, "be careful of the car approaching from your left side ahead of you," instead of precisely detecting the obstacle. However, when an obstacle is determined to be a vehicle which is moving in a direction receding farther from the user 110, the obstacle detecting apparatus 100 may change the operation mode to the sleep mode or the standby mode without providing the user 110 with such a warning signal.

In the second detection mode, the obstacle detecting apparatus 100 may obtain accurate information of an obstacle located in a specific direction using a plurality of antennas included in a communication module corresponding to the direction. A plurality of antennas may be arranged in each of the communication modules. The obstacle detecting apparatus 100 may detect the obstacle more precisely through beamforming using the antennas of the communication module selected from among the communication modules. The communication module may include a baseband module and the plurality of antennas. Here, an antenna may be in a structure that is combined with a radio-frequency integrated circuit (RFIC).

In an example, the obstacle detecting apparatus 100 may focus a detection signal in a specific direction through beamforming. The obstacle detecting apparatus 100 may adjust a plurality of antennas or an array antenna such that the detection signal has directivity. The obstacle detecting apparatus 100 may implement multiplexing based on spatial filtering using beamforming, and implement spatial multiplexing. The obstacle detecting apparatus 100 may apply beamforming to a detection signal and a reflected signal. Thus, the obstacle detecting apparatus 100 may obtain more precise information through the detection signal having directivity.

The obstacle detecting apparatus 100 may provide a warning signal associated with an obstacle based on more precise information of the obstacle. For example, the obstacle detecting apparatus 100 may recognize a small object or an object with a narrow width, and provide the user 110 with a warning signal. For example, referring to FIG. 1, the obstacle detecting apparatus 100 may detect an object with a narrow width, for example, a traffic light 121, and provide the user 110 with a warning signal indicated as, for example, "be careful of the traffic light on your left." In an example, the warning signal may be an auditory or visual, or tactile feedback, such as vibrations of a mobile device.

The obstacle detecting apparatus 100 may provide the user 110 with a warning signal in various ways. The obstacle detecting apparatus 100 may provide the user 110 with a warning signal through visual, auditory, or tactile feedback. For example, the obstacle detecting apparatus 100 may provide a warning signal to the user 110 through vibration. In this example, the obstacle detecting apparatus 100 may provide the warning signal to the user 110 through a vibrator corresponding to a certain position. Through this, the obstacle detecting apparatus 100 may provide the warning signal to the user 110 who does not view or is not able to view. For another example, the obstacle detecting apparatus 100 may provide a warning signal to the user 110 through an edge lighting unit corresponding to a certain direction. The edge lighting unit may refer to a linear light source that is separately installed at an edge of a smartphone, and be installed on each side of the smartphone. For still another example, the obstacle detecting apparatus 100 may provide a warning signal in a form of a pop-up or a message to be displayed on a display. Through this, the obstacle detecting apparatus 100 may provide the warning signal to the user 110 who is viewing the display.

Figure 2:
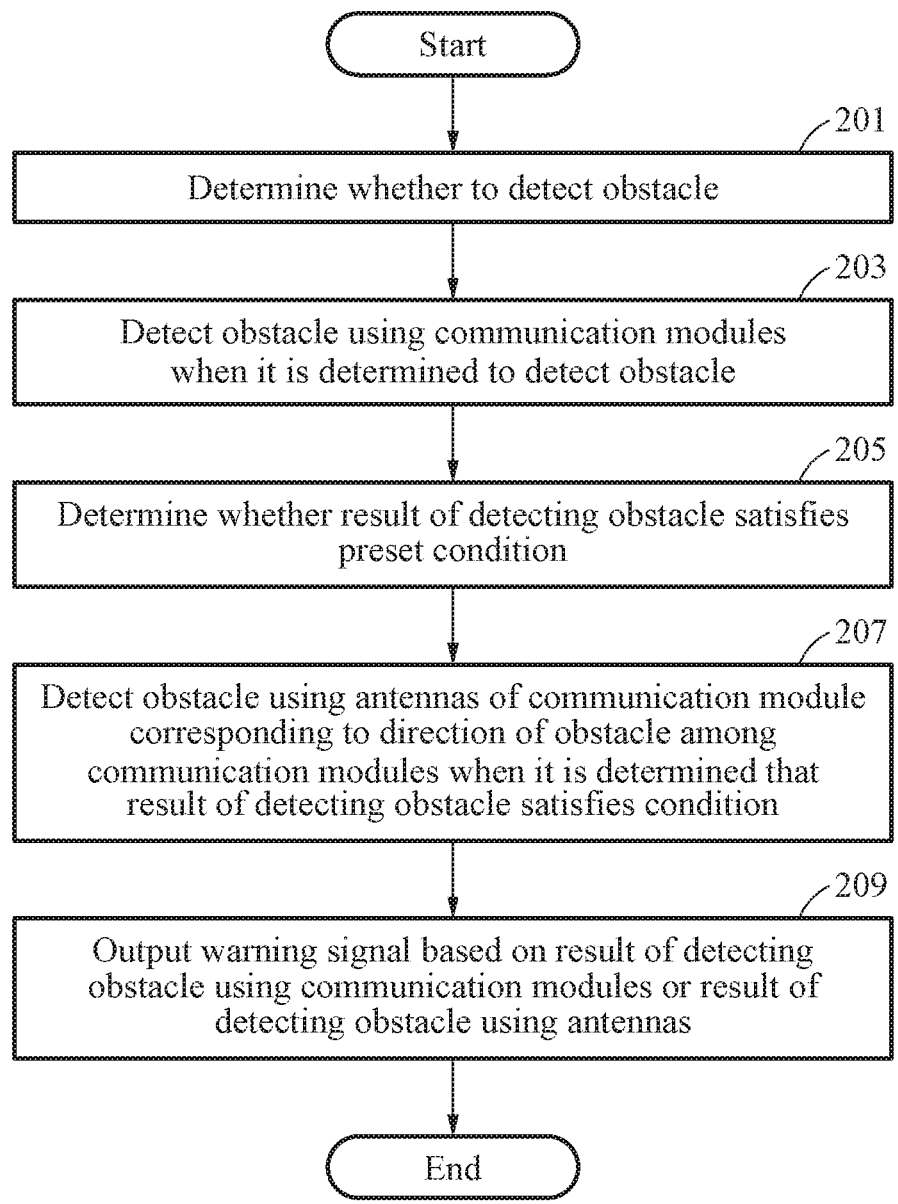
FIG. 2 is a diagram illustrating an example of an obstacle detecting method.

FIG. 2 is a diagram illustrating an example of an obstacle detecting method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, and devices such as a processor, that perform the specified functions, or combinations of special purpose hardware and computer instructions. In addition to the description of FIG. 2 below, the descriptions of FIG. 1 is also applicable to FIG. 2 and are incorporated herein by reference. Thus, the above description may not be repeated here.

Referring to FIG. 2, in operation 201, the obstacle detecting apparatus 100 determines whether to detect an obstacle. The obstacle detecting apparatus 100 obtains environment information using a plurality of communication modules or other sensors in the obstacle detecting apparatus 100. The obstacle detecting apparatus 100 transmits a detection signal in all directions and obtains the environment information through a reflected signal. By determining whether to detect an obstacle based on the environment information, the obstacle detecting apparatus 100 may increase a degree of precision in detecting the obstacle step by step and effectively use a limited resource.

In operation 203, when the obstacle detecting apparatus 100 determines to detect an obstacle, the obstacle detecting apparatus 100 detects an obstacle using the plurality of communication modules. For example, the obstacle detecting apparatus 100 may detect an obstacle using a plurality of communication modules using various wireless communication methods such as, for example, 5G communication and WiFi communication of 802.11ad/ay of the IEEE. Thus, the obstacle detecting apparatus 100 may utilize an already installed communication module that is used for wireless communication of a smartphone, and the like, thereby reducing a cost and reduce a volume.

The obstacle detecting apparatus 100 detects the obstacle using the communication modules. For example, the obstacle detecting apparatus 100 may detect the obstacle by selectively using some of the communication modules. In an example, the obstacle detecting apparatus 100 may transmit a second detection signal to the obstacle by alternately using the communication modules. The obstacle detecting apparatus 100 may output a result of detecting the obstacle from a second reflected signal corresponding to the second detection signal.

In operation 205, the obstacle detecting apparatus 100 determines whether the result of detecting the obstacle satisfies a condition or threshold. For example, the obstacle detecting apparatus 100 may determine whether a signal-to-noise ratio (SNR) of the second reflected signal that is reflected from the obstacle, a direction of the obstacle, and a distance from the obstacle detecting apparatus 100, which are included in the result of detecting the obstacle using the communication modules, satisfy the condition. When the result of detecting the obstacle does not satisfy the condition, the obstacle detecting apparatus 100 may change an operation mode to a sleep mode or a standby mode. As described, the obstacle detecting apparatus 100 may effectively use a limited source by gradually increasing a degree of precision in detecting an obstacle.

In operation 207, when the result of detecting the obstacle satisfies the condition, the obstacle detecting apparatus 100 detects the obstacle using a plurality of antennas of a communication module corresponding to a direction of the obstacle from among the communication modules. For example, the obstacle detecting apparatus 100 may transmit, to the obstacle, a third detection signal beamformed using the antennas. The obstacle detecting apparatus 100 may focus a detection signal in a certain direction through beamforming. The obstacle detecting apparatus 100 may apply beamforming to a detection signal and a reflected signal. The obstacle detecting apparatus 100 may output a result of detecting the obstacle from a third reflected signal corresponding to the third detection signal.

In operation 209, the obstacle detecting apparatus 100 outputs a warning signal based on the result of detecting the obstacle using the communication modules or the result of detecting the obstacle using the antennas. The obstacle detecting apparatus 100 may output the warning signal visually, auditorily, or tactilely. For example, the obstacle detecting apparatus 100 may provide the warning signal to a user through a vibrator, a speaker, an edge lighting unit, or a display corresponding to a certain direction.

Figure 3:
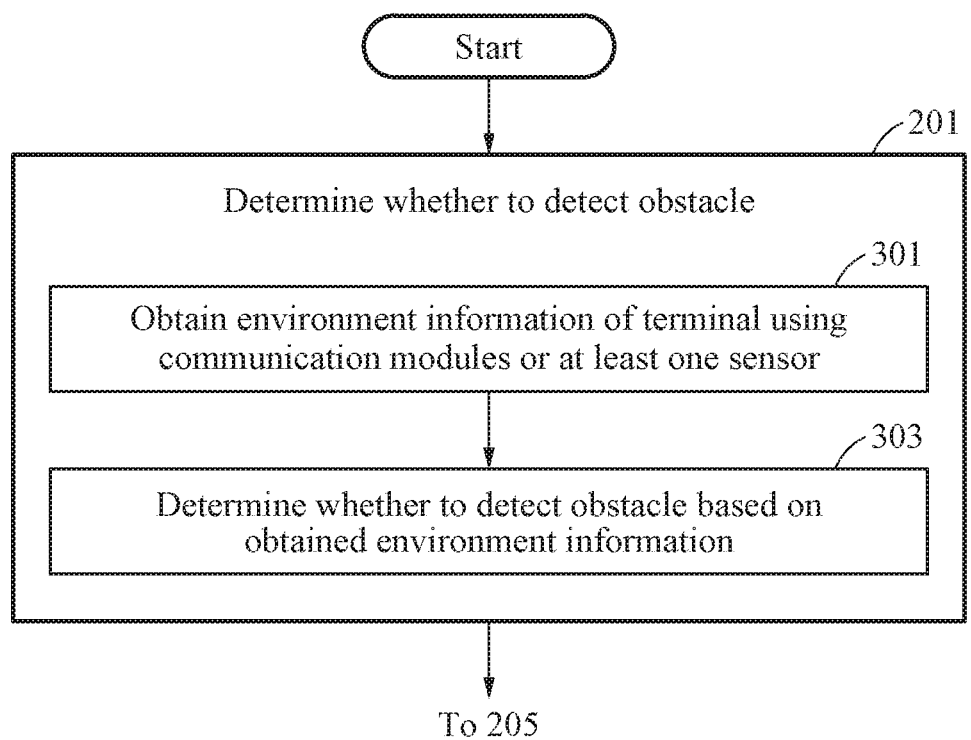
FIG. 3 is a diagram illustrating an example of determining whether to detect an obstacle.

FIG. 3 is a diagram illustrating an example of determining whether to detect an obstacle. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, and devices such as a processor, that perform the specified functions, or combinations of special purpose hardware and computer instructions. In addition to the description of FIG. 3 below, the descriptions of FIGS. 1-2 is also applicable to FIG. 3 and are incorporated herein by reference. Thus, the above description may not be repeated here.

Referring to FIG. 3, in operation 201, the obstacle detecting apparatus 100 determines whether to detect an obstacle. The obstacle detecting apparatus 100 may obtain environment information using a plurality of communication modules or other sensors. In operation 301, the obstacle detecting apparatus 100 obtains environment information of a terminal using a plurality of communication modules or at least one sensor. The obstacle detecting apparatus 100 transmits a first detection signal in all directions using the communication modules, and receives a first reflected signal corresponding to the first detection signal.

In operation 303, the obstacle detecting apparatus 100 determines whether to detect the obstacle based on the environment information. The obstacle detecting apparatus 100 determines whether to detect the obstacle based on the first reflected signal. The obstacle detecting apparatus 100 determines whether the obstacle is present or not based on an intensity of the first reflected signal. In an example, when the obstacle is determined to be present, the obstacle detecting apparatus 100 determines whether the obstacle is present at close or far based on the intensity of the first reflected signal. When the obstacle is determined to be present at a long distance from the object, the obstacle detecting apparatus 100 determines whether to detect the obstacle based on an intensity of a reflected signal. When the obstacle detecting apparatus 100 determines that there is no need to detect an obstacle, the obstacle detecting apparatus 100 may change an operation mode to a sleep mode or a standby mode, preventing the unnecessary consumption of power or the use of resources.

Figure 4:
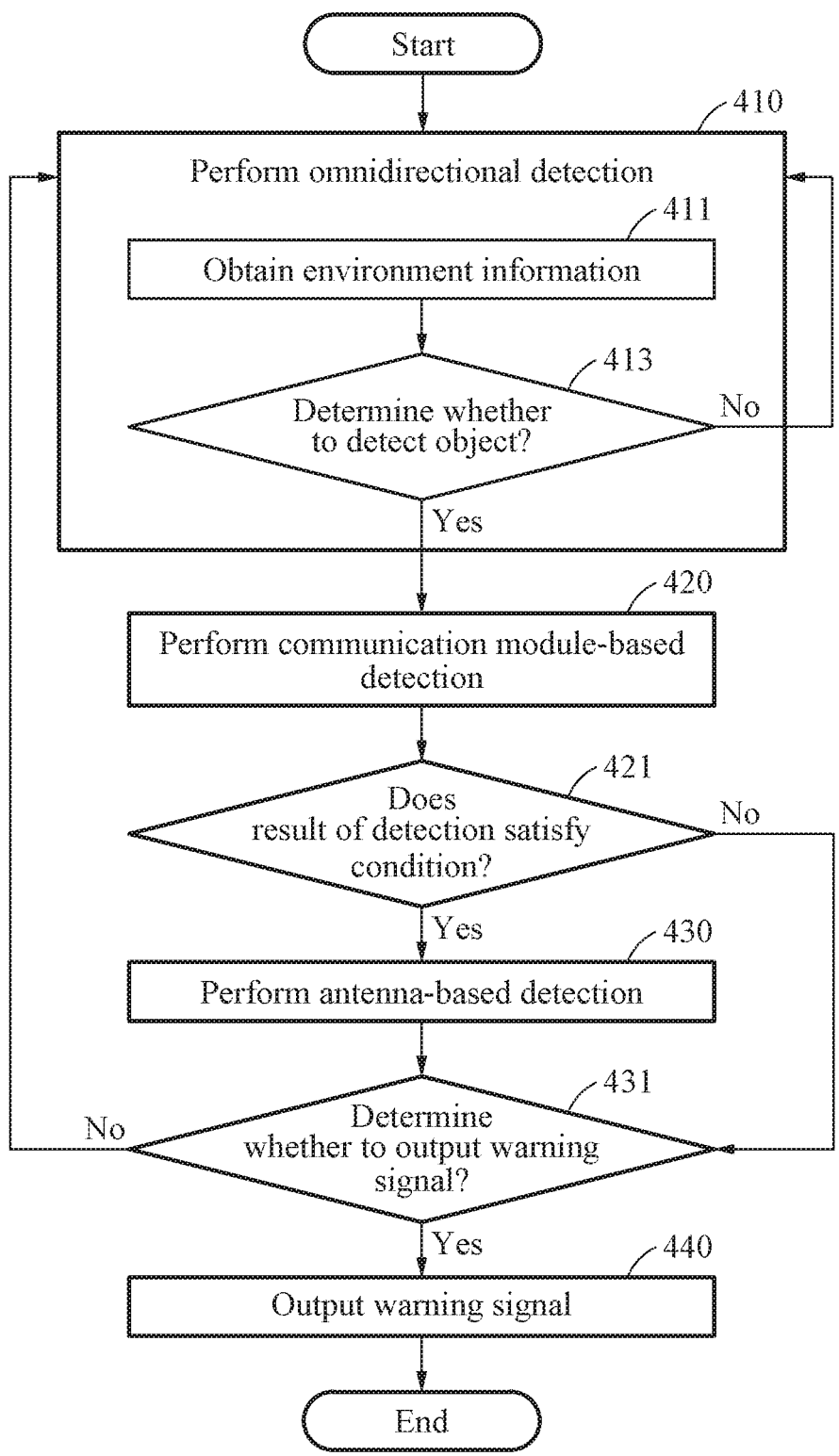
FIG. 4 is a diagram illustrating an example of an obstacle detecting method.

FIG. 4 is a diagram illustrating an example of an obstacle detecting method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, and devices such as a processor, that perform the specified functions, or combinations of special purpose hardware and computer instructions. In addition to the description of FIG. 4 below, the descriptions of FIGS. 1-3 is also applicable to FIG. 4 and are incorporated herein by reference. Thus, the above description may not be repeated here.

Referring to FIG. 4, in operation 410, the obstacle detecting apparatus 100 operates in a standby mode. The obstacle detecting apparatus 100 performs omnidirectional detection. In operation 411, the obstacle detecting apparatus 100 obtains environment information. In operation 413, the obstacle detecting apparatus 100 determines whether to detect an obstacle. When the obstacle detecting apparatus 100 determines not to detect an obstacle, the obstacle detecting apparatus 100 stays in the standby mode in which the obstacle detecting apparatus 100 performs the omnidirectional detection.

In operation 420, when the obstacle detecting apparatus 100 determines to detect an obstacle, the obstacle detecting apparatus 100 operates in a first detection mode in which the obstacle detecting apparatus 100 performs communication module-based detection. The obstacle detecting apparatus 100 may selectively turn on and/or off a plurality of communication modules each corresponding to a certain direction, and thus may roughly verify information of an obstacle present in a corresponding direction.

In operation 421, the obstacle detecting apparatus 100 determines whether a result of the communication module-based detection satisfies a condition or threshold. For example, the obstacle detecting apparatus 100 may determine, for example, whether a size of an obstacle present in a direction is less than a threshold value, whether the obstacle detecting apparatus 100 is predicted to collide with an obstacle based on a travel direction and a velocity of the obstacle, and whether a type of the obstacle corresponds to an object included in a registered list. The conditions described above are non-exhaustive illustration, and other conditions and thresholds are considered to be well within the scope of the present disclosure. When the result of the communication module-based detection does not satisfy the condition, the obstacle detecting apparatus 100 skips a second detection mode and performs operation 431.

In operation 430, the obstacle detecting apparatus 100 operates in the second detection mode in which the obstacle detecting apparatus 100 performs antenna-based detection. The obstacle detecting apparatus 100 obtains information of the obstacle using a plurality of antennas included in a communication module corresponding to a certain direction. The obstacle detecting apparatus 100 may obtain relatively accurate information of the obstacle through beamforming.

In operation 431, the obstacle detecting apparatus 100 determines whether to output a warning signal. The obstacle detecting apparatus 100 determines whether to output the warning signal by combining a result of the first detection mode and a result of the second detection mode. When the obstacle detecting apparatus 100 determines not to output the warning signal, the obstacle detecting apparatus 100 changes an operation mode to the standby mode. For example, the obstacle detecting apparatus 100 may comprehensively determine, for example, whether a size of the obstacle present in the direction is less than a threshold value, whether the obstacle detecting apparatus 100 is predicted to collide with the obstacle based on a travel direction and a velocity of the obstacle, and whether a type of the obstacle corresponds to an object included in a registered list.

In operation 440, the obstacle detecting apparatus 100 outputs the warning signal. The obstacle detecting apparatus 100 may provide the warning signal to a user in various ways based on a condition of the user. For example, the obstacle detecting apparatus 100 may determine whether the user views the obstacle detecting apparatus 100 or not, and select a type of the warning signal from among a visual type, an auditory type, and a tactile type.

Figure 5:
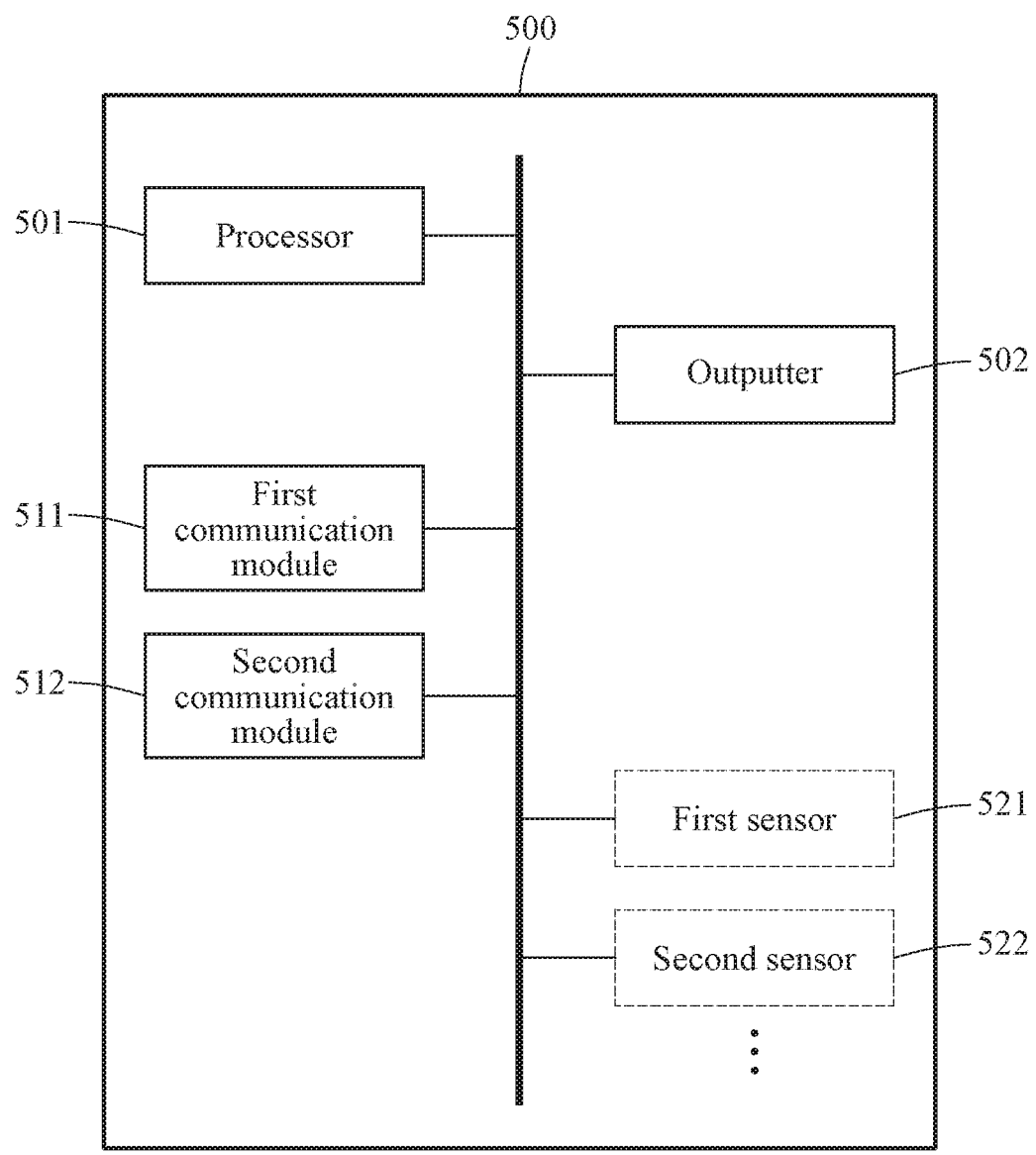
FIG. 5 is a diagram illustrating an example of an obstacle detecting apparatus.

FIG. 5 is a diagram illustrating an example of an obstacle detecting apparatus.

Referring to FIG. 5, the obstacle detecting apparatus 500 includes a processor 501, a plurality of communication modules including a first communication module 511 and a second communication module 512, and an outputter 502.

The processor 501 may determine whether to detect an obstacle. The communication modules may transmit a first detection signal in all directions. The communication modules may receive a first reflected signal corresponding to the first detection signal.

In an example, the processor 501 is configured to execute instructions or programs, or to control the obstacle detecting apparatus 500. The processor 51 includes, for example, a central processing unit (CPU), a processor core, a multi-core processor, a reconfigurable processor, a multicore processor, a multiprocessor, an application-specific integrated circuit (ASIC), and a field programmable gate array (FPGA), and/or a graphics processing unit (GPU), or any other type of multi- or single-processor configuration. In an example, the obstacle detecting apparatus 500 is connected to an external device via the one or more of the plurality of communication modules, and exchanges data. Further details regarding the processor 501 is provided below.

In an example, the processor 501 may determine whether to detect the obstacle based on the first reflected signal. The processor 501 may determine whether the obstacle is present based on an intensity of the first reflected signal. When the obstacle is determined to be present, the processor 501 may determine whether the obstacle is close or far-away based on the intensity of the first reflected signal. When the obstacle is determined to be present at the long distance, in an example, the processor 501 may determine whether to detect the obstacle based on the intensity of the first reflected signal.

The obstacle detecting apparatus 500 may further include one or more sensors including a first sensor 521 and a second sensor 522 as illustrated. The processor 501 may obtain environment information of a terminal using the communication modules or the sensors. The processor 501 may determine whether to detect an obstacle based on the environment information.

When the processor 501 determines to detect an obstacle, the processor 501 may detect the obstacle using the communication modules. The processor 501 may detect the object by selectively using one or more of the communication modules. The communication modules may alternately transmit a second detection signal to the obstacle and receive a second reflected signal corresponding to the second detection signal. The processor 501 may output a result of detecting the obstacle that is obtained by analyzing the second reflected signal.

The processor 501 may determine whether the result of detecting the obstacle satisfies a condition or threshold. When the result of detecting the obstacle is determined to satisfy the condition, the processor 501 may detect the obstacle using a plurality of antennas of a communication module corresponding to a direction of the obstacle among the communication modules.

For example, the processor 501 may determine whether an SNR of the second reflected signal that is reflected from the obstacle, the direction of the obstacle, a distance from the terminal, which are included in the result of detecting the obstacle using the communication modules, satisfy the threshold or condition.

The communication module corresponding to the direction of the obstacle may transmit a beamformed third detection signal and receive a third reflected signal corresponding to the third detection signal. The processor 501 may output a result of detecting the obstacle that is obtained by analyzing the third reflected signal.

In an example, the obstacle detecting apparatus 500 interacts with the user through the outputter 502. In an example, the outputter 502 may output a warning signal based on the result of detecting the obstacle using the communication modules or the result of detecting the obstacle using the antennas. In an example, the outputter 502 may include, for example, a display, a touchscreen, a speaker, a vibration generator, and other devices that may provide an output to a user. The outputter 502 may output the warning signal visually, auditorily, or tactilely.

However, the outputter 502 are not limited to the example described above, and any other displays, such as, for example, computer monitor and eye glass display (EGD) that are operatively connected to the obstacle detecting apparatus 500 may be used without departing from the spirit and scope of the illustrative examples described. In an example, the outputter 502 is a physical structure that includes one or more hardware components that provide the ability to render a user interface and/or render a display.

Figure 6:
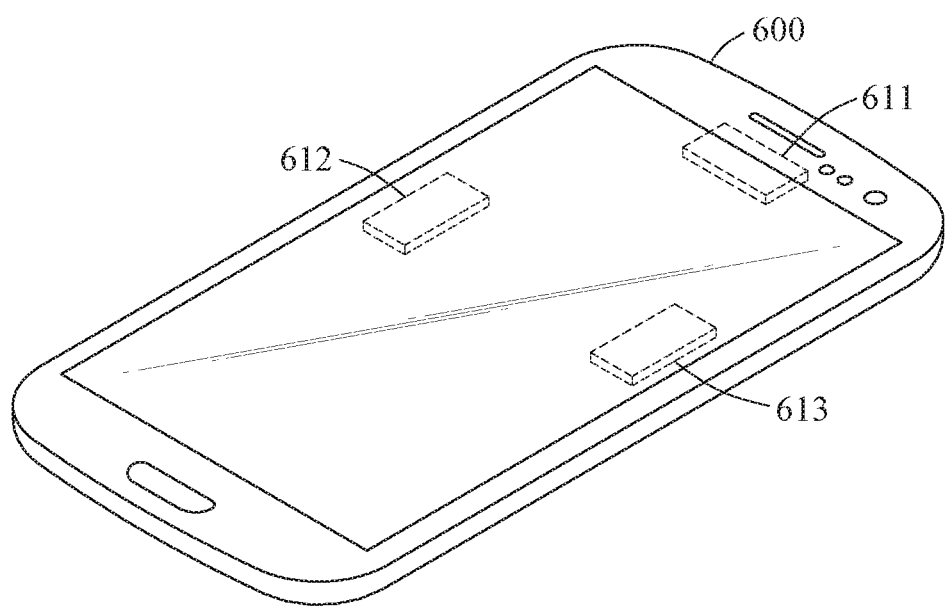
FIG. 6 is a diagram illustrating an example of a terminal implementing an obstacle detecting apparatus and including a plurality of communication modules.

FIG. 6 is a diagram illustrating an example of a terminal implementing an obstacle detecting apparatus and including a plurality of communication modules disposed therein.

Referring to FIG. 6, the obstacle detecting apparatus 600 includes a plurality of communication modules, for example, communication modules 611, 612, and 613. In an example, the communication modules 611, 612, and 613 are disposed in the obstacle detecting apparatus 600 by being distributed in the obstacle detecting apparatus 600 as shown in FIG. 6. For example, as illustrated, the communication module 611 is disposed in an upper portion of the obstacle detecting apparatus 600, the communication module 612 is disposed on a left side of the obstacle detecting apparatus 600, and the communication module 613 is disposed on a right side of the obstacle detecting apparatus 600. Thus, since the communication modules 611, 612, and 613 are disposed in the obstacle detecting apparatus 600 by being distributed as illustrated, the obstacle detecting apparatus 600 may detect an obstacle in all directions.

In a first detection mode, the obstacle detecting apparatus 600 may divide a detection area in which an obstacle is be detected into a front side, a left side, and a right side using the communication modules 611, 612, and 613, and thus obtain rough information associated with a direction of the obstacle. The obstacle detecting apparatus 600 may detect the direction of the obstacle by turning on and/or off each of the communication modules 611, 612, and 613. For example, the obstacle detecting apparatus 600 may detect the direction of the obstacle by selectively using a group of communication modules corresponding to the direction, for example, a group of the communication module 611 and the communication module 612 or a group of the communication module 611 and the communication module 613.

The obstacle detecting apparatus 100, 500, and 600, and other apparatuses, devices, units, modules, and components described herein with respect to FIGS. 1, 5 and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 2-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the obstacle detecting method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of detecting an obstacle near a device, the method comprising:
   determining whether to detect an obstacle;
   detecting the obstacle using communication modules in a first area, in response to determining to detect the obstacle;
   determining whether a result of detecting the obstacle meets a threshold;
   detecting the obstacle in a second area using antennas of a communication module corresponding to a direction of the obstacle from among the communication modules, in response to the result of determining the obstacle meeting the threshold; and
   outputting a warning signal based on the result of detecting the obstacle using the communication modules or a result of detecting the obstacle using the antennas,
   wherein the second area is comprised in and smaller than the first area.

2. The obstacle detecting method of claim 1, wherein the determining of whether to detect the obstacle comprises:
   obtaining environment information of the device using any one or any combination of the communication modules and at least one sensor; and
   determining whether to detect the obstacle based on the obtained environment information.

3. The obstacle detecting method of claim 1, wherein the determining of whether to detect the obstacle comprises:
transmitting a first detection signal in all directions using the communication modules;
receiving a first reflected signal corresponding to the first detection signal; and
determining whether to detect the obstacle based on the received first reflected signal.

4. The obstacle detecting method of claim 3, wherein the determining of whether to detect the obstacle based on the first reflected signal comprises:
determining whether the obstacle is present based on an intensity of the first reflected signal;
determining whether the obstacle is present at a short distance or at a long distance based on the intensity of the first reflected signal, in response to the obstacle being present; and
determining whether to detect the obstacle based on the intensity of the first reflected signal, in response to the obstacle being present at the long distance.

5. The obstacle detecting method of claim 1, wherein the detecting of the obstacle using the communication modules comprises:
detecting the obstacle by selectively using a portion of the communication modules.

6. The obstacle detecting method of claim 5, wherein the detecting of the obstacle using the communication modules in the first area comprises:
transmitting a second detection signal to the obstacle by alternately using the communication modules; and
outputting a result of detecting the obstacle from a second reflected signal corresponding to the second detection signal.

7. The obstacle detecting method of claim 1, wherein the determining of whether the result of detecting the obstacle meets a threshold comprises:
determining whether a signal-to-noise ratio (SNR) of a second reflected signal that is reflected from the obstacle, the direction of the obstacle, and a distance from the device, which are included in the result of detecting the obstacle using the communication modules, each satisfy a condition.

8. The obstacle detecting method of claim 1, wherein the detecting of the obstacle in the second area using the antennas comprises:
transmitting, to the obstacle, a third detection signal beamformed using the antennas; and
outputting a result of detecting the obstacle from a third reflected signal corresponding to the third detection signal.

9. The obstacle detecting method of claim 1, wherein the outputting of the warning signal comprises:
outputting the warning signal visually, auditorily, or tactilely.

10. A non-transitory computer-readable storage medium storing instructions that, when executed by a processor, cause the processor to perform the obstacle detecting method of claim 1.

11. An obstacle detecting apparatus comprising:
communication modules;
a processor configured to:
determine whether to detect an obstacle;
detect the obstacle using the communication modules in a first area, in response to determining to detect the obstacle;
determine whether a result of detecting the obstacle meets a threshold; and
detect the obstacle in a second area using antennas of a communication module corresponding to a direction of the obstacle from among the communication modules, in response to the result of detecting the obstacle meeting the threshold; and
an outputter configured to output a warning signal based on the result of detecting the obstacle using the communication modules or a result of detecting the obstacle using the antennas,
wherein the second area is comprised in and smaller than the first area.

12. The obstacle detecting apparatus of claim 11, wherein the communication modules is configured to:
transmit a first detection signal in all directions;
receive a first reflected signal corresponding to the first detection signal,
wherein the processor is further configured to:
determine whether to detect the obstacle based on the received first reflected signal.

13. The obstacle detecting apparatus of claim 12, wherein the processor is further configured to:
determine whether the obstacle is present based on an intensity of the first reflected signal;
determine whether the obstacle is present at a short distance or at a long distance based on the intensity of the first reflected signal, in response to the obstacle being present; and
determine whether to detect the obstacle based on the intensity of the first reflected signal, in response to the obstacle being present at the long distance.

14. The obstacle detecting apparatus of claim 11,
wherein the processor is further configured to
obtain environment information of the obstacle detecting apparatus using any one or any combination of the communication modules and at least one sensor; and
determine whether to detect the obstacle based on the obtained environment information.

15. The obstacle detecting apparatus of claim 11, wherein the processor is further configured to:
detect the obstacle by selectively using a portion of the communication modules.

16. The obstacle detecting apparatus of claim 15, wherein the communication modules is configured to:
alternately transmit a second detection signal to the obstacle; and
receive a second reflected signal corresponding to the second detection signal,
wherein the processor is further configured to:
output a result of detecting the obstacle by analyzing the second reflected signal.

17. The obstacle detecting apparatus of claim 11, wherein the processor is further configured to:
determine whether a signal-to-noise ratio (SNR) of a second reflected signal that is reflected from the obstacle, the direction of the obstacle, and a distance from the obstacle detecting apparatus, which are included in the result of detecting the obstacle using the communication modules, each satisfy a condition.

18. The obstacle detecting apparatus of claim 11, wherein the communication module corresponding to the direction of the obstacle is configured to:
transmit a beamformed third detection signal to the obstacle; and
receive a third reflected signal corresponding to the third detection signal,
wherein the processor is further configured to:

output a result of detecting the obstacle by analyzing the third reflected signal.

19. The obstacle detecting apparatus of claim 11, wherein the outputter is further configured to output any one or any combination of visual, auditory, and tactile warning signal.

20. An obstacle detecting apparatus comprising:
a processor configured to:
   determine whether to detect an obstacle in a vicinity of the apparatus based on environment information of the apparatus,
   transmit a first detection signal around the apparatus using communication modules to detect the obstacle,
   determine a direction of the obstacle using the first reflected signal received at the communication modules,
   detect the obstacle using a second detection signal beamformed using antennas of a communication module corresponding to the direction of the obstacle from among the communication modules, in response to the first reflected signal meeting a threshold, and
   output a warning signal based on any one or any combination of a second reflected signal corresponding to the second detection signal and the first reflected signal; and
an outputter configured to output the warning signal.

21. The obstacle detecting apparatus of claim 20, wherein the processor is further configured to periodically obtain the environment information of the apparatus, in response to determining not to detect the obstacle based on the environment information of the apparatus.

22. The obstacle detecting apparatus of claim 21, wherein the processor is further configured to obtain the environment information of the apparatus, in response to detecting a motion of the apparatus.

23. The obstacle detecting apparatus of claim 20, wherein the threshold is based on any one or any combination of the direction of the obstacle, a size of the obstacle, a type of the obstacle, a moving speed of the obstacle, a moving speed of the apparatus, and a relative moving direction of the obstacle and the apparatus.

* * * * *